United States Patent [19]
Tachibana et al.

[11] Patent Number: 6,088,314
[45] Date of Patent: Jul. 11, 2000

[54] DISC READING APPARATUS USING OPTICAL PICK-UP

[75] Inventors: Tadashi Tachibana; Yasunori Kuwayama; Shoji Saito, all of Daito, Japan

[73] Assignee: Funai Electric Co., Ltd., Osaka, Japan

[21] Appl. No.: 09/009,076

[22] Filed: Jan. 20, 1998

[30] Foreign Application Priority Data

Jan. 28, 1997 [JP] Japan ..................................... 9-013812
Feb. 5, 1997 [JP] Japan ..................................... 9-022282

[51] Int. Cl.$^7$ ............................... G11B 5/09; G11B 15/46
[52] U.S. Cl. ............................ 369/50; 369/32; 360/73.03
[58] Field of Search ................................... 369/30, 32, 33, 369/44.28, 47, 48, 50, 54, 58; 360/73.03

[56] References Cited

U.S. PATENT DOCUMENTS

| | | | |
|---|---|---|---|
| 5,677,899 | 10/1997 | Getreuer | 369/44.28 |
| 5,691,968 | 11/1997 | Tomishima et al. | 369/50 |
| 5,780,982 | 7/1998 | Tagiri | 339/48 X |

*Primary Examiner*—Paul W. Huber
*Attorney, Agent, or Firm*—Lachenbach Siegel Marzullo Aronson & Greenspan, P.C.

[57] ABSTRACT

A disc reading apparatus includes a microcomputer. The microcomputer calculates, based on amount data, an outer radius (RM) of an area that is recording data. The reading speed on the determined outer radius is set to a previously set speed ($V_2$) for the outer circumference. When reading desired data, a radius of an inner circumference (r) of the data-recorded area is calculated from time information (identification data) to calculate a reading speed ($V_n$) for reading the data. That is, since the disc contains data recorded such that the linear velocity per unit area becomes constant, the position of a pick-up and the reading speed are represented by a generally inversely proportional linear equation. Therefore, the reading speed ($V_n$) can be calculated based on the inner radius (r) of the area recording the data to be read, the inner and outer radii (RS, RM) of the data-recorded area, and previously set inner and outer speeds ($V_1$, $V_2$).

21 Claims, 8 Drawing Sheets

DISC READING APPARATUS USING OPTICAL PICK-UP

BACKGROUND OF THE INVENTION

1. Field of the Invention

This invention relates to disc reading apparatuses. More particularly, this invention relates to a disc reading apparatus adapted to read data, through an optical pick-up, out of a recording medium having a spiral track formed thereon.

2. Description of Prior Art

Recording mediums, typically represented by CD-ROMs, have a track on a surface thereof to contain data that has been recorded at a constant linear velocity so as to have constant record density at throughout inner and outer tracks. To read the data out of such a recording medium, the disc is rotatably driven at rotational speeds commensurate with the point being reproduced. That is, the data recorded on the disc is reproduced by varying the rotational speed of the disc matched to the reproducing point. However, there has been a problem that data cannot be read out until the disc rotational speed reaches a speed matched to a point to be reproduced. To cope with this, there is a conventional method in general use for reading out data, wherein the area that can record data conforming to ISO9660 is divided into a plurality of zones beforehand so that each zone has a rotational speed set such that the data can be read at a maximum fast speed.

However, if the data to be read resides over a plurality of zones, the disc rotational speed has to be varied during data reading. Consequently, when reading the data in the next zone, there is a necessity of waiting for reaching the disc rotational speed to a speed for the zone. Furthermore, the disc rotational speed is determined for each zone based on the rotational or reading speed for reading at an outer circumference of a data-recordable area. Therefore, where the amount of data recorded on the disc is comparatively small, i.e. where the radius of the outer circumference of the data-recorded area is small in comparison with the outer radius of the data-recordable area, there has been a problem that it is impossible to read data at speed expected from signal processing capability or disc motor power performances.

SUMMARY OF THE INVENTION

Therefore, it is a primary object of the present invention to provide a novel disc reading apparatus.

It is another object of the present invention to provide a disc reading apparatus which is capable of reading data at a possible maximum speed.

A disc reading apparatus according to the present invention comprises: a first calculating means for calculating, based on amount data, an outer radius of a data-recorded area having data recorded therein, the amount data being recorded together with the data on a disc so as to represent an amount of the data; a setting means for setting, for the calculated outer radius, a previously-set first predetermined speed on an outer circumference of a data-recordable area that can record data therein; and a speed calculating means for calculating a reading speed for the data to be read based on the first predetermined speed.

In one preferred embodiment of the disc reading apparatus, the reading speed on the outer radius of the data-recorded area is set to the previously set first predetermined speed on the outer radius of the data-recordable area. This first predetermined speed is a maximum fast speed in a speed range in which data can be read out of the disc, which is determined based on an LSI signal processing capability and previously stored in a ROM of a microcomputer. Further, the inner radius of the area recording the data to be read is calculated from identification data represented by time information. The reading speed for the data to be read is calculated based on the inner radius of the area recording the data to be read, the inner and outer radii of the data-recorded area, and the first predetermined speed and a previously-set second predetermined speed on the inner circumference of the data recorded area. Thus, the disc is controlled to the calculated reading speed so that the data can be read.

In this embodiment, since the reading speed for the data to be read is determined based on the reading speed on the outer circumference of the data-recorded area, i.e. the maximum fast speed at which the data can be read out. Accordingly, it is possible to read data at high speeds while fully exhibiting the performance of the apparatus.

In another phase of the present invention, a disc reading apparatus comprises: a first calculating means for calculating, based on amount data, an outer radius of a data-recorded area having data recorded therein, the amount data being recorded together with the data on a disc so as to represent an amount of the data; a setting means for setting, for the calculated outer radius, a previously-set first predetermined rotational speed on an outer circumference of a data-recordable area that can record data therein; and a speed calculating means for calculating a rotational speed of said disc for reading the data based on the first predetermined rotational speed.

In one preferred embodiment of the disc reading apparatus, the rotational speed on the outer radius of the data-recorded area is set to a previously set first rotational speed on the outer radius of the data-recordable area. This first predetermined rotational speed is a maximum fast speed in a speed range in which data can be read out of the disc, which is determined based on an LSI signal processing capability and previously stored in a ROM of a microcomputer. Further, this first predetermined rotational speed can be substituted by the reading speed. That is, the reading speed is previously memorized in a ROM of a microcomputer, so that the reading speed for the data to be read is calculated based on the reading speed read out of the ROM, the inner radius of the area recording the data to be read, and the inner and outer radii of the data-recorded area. The calculated reading speed is converted into a rotational speed of the disc. Thus, the data can be read out of the disc that is rotating at rotational speeds calculated on a zone-by-zone basis.

In this embodiment, since the rotational speed for reading the data to be read is determined based on the rotational speed on the outer circumference of the data-recorded area, i.e. the maximum fast speed at which the data can be read out. Accordingly, it is possible to read data at high speeds while fully exhibiting the performance of the apparatus.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
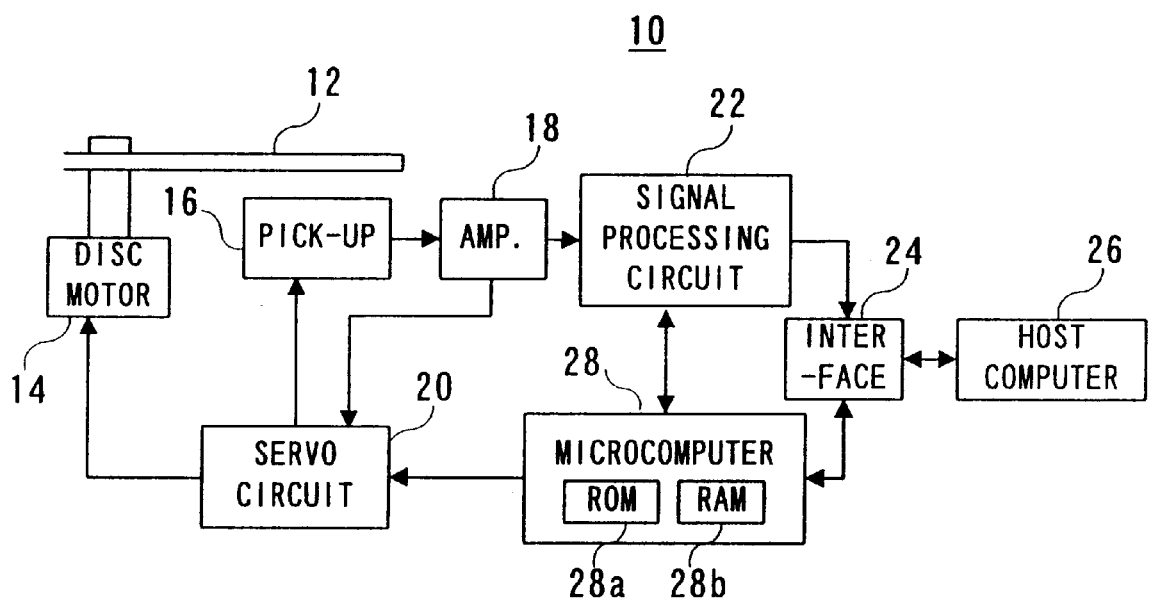
FIG. 1 is a block diagram showing one embodiment of the present invention.

In an embodiment shown in FIG. 1, a disc reading apparatus 10 includes a disc motor 14 for controlling the rotational speed of a disc 12 formed, for example, by a CD-ROM (CD-Read Only Memory) so that the disc 12 is driven by the disc motor 14. The data is read out of the disc 12 through an optical pick-up 16 arranged to move in vertical and horizontal directions.

This pick-up 16 is arranged movable in a radial direction of the disc 12, and includes a light receiving element formed, for example, by a photo-diode. By the light receiving element, the light (laser light) reflected by a main surface of the disc 12 is converted into an electrical signal. Based on the output of the light receiving element, detected respectively are a focussing error signal for enabling the pick-up 16 to follow the vertical movement of the disc 12 and a tracking error signal for performing accurate scanning over a track formed on the main surface of the disc 12.

More specifically, a cylindrical lens, not shown, is prepared between a semiconductor laser, not shown, as a light emitting element and the disc 12 so that the light receiving element is placed at such a location that a laser beam presents a true circle when the disc 12 is positioned at a focussing position. When this light receiving element receives an incoming laser beam of a vertically-elliptical or horizontally-elliptical circular form passed through the cylindrical lens, the light receiving element outputs an S-form signal, i.e. a focussing error signal, corresponding to the displacement of the disc. Besides the laser beam for detecting the focussing error signal and a reproduced signal, two sub-beams are prepared by utilizing a diffraction grating. The two sub-beams reflected by the disc 12 at its pit-absent portions, i.e. land portions, are converted by the light receiving element into respective electrical signals. Thereafter, the electrical signals are outputted to an error amplifier, not shown, whereby a tracking error signal similar to the focussing error signal is detected. Incidentally, it is needless to say that a method other than the above may be utilized as a method for detecting the focussing error signal and the tracking error signal.

The focussing error signal and the tracking error signal thus obtained are respectively supplied to a servo circuit 20 through an amplifier 18, thereby controlling the entire pick-up 16 or a part thereof (e.g. an objective lens). On the other hand, the reproduced signal read from the disc 12 through the pick-up 16 is amplified, waveform-equalized and waveform-shaped (binarized) by the amplifier 18, and converted into a rectangular pulse, i.e. an EFM (Eight to Fourteen Modulation) signal. This EFM signal is processed by a signal processing circuit 22 constituted by an LSI as shown in detail in FIG. 2, as stated hereinbelow.

Figure 2:
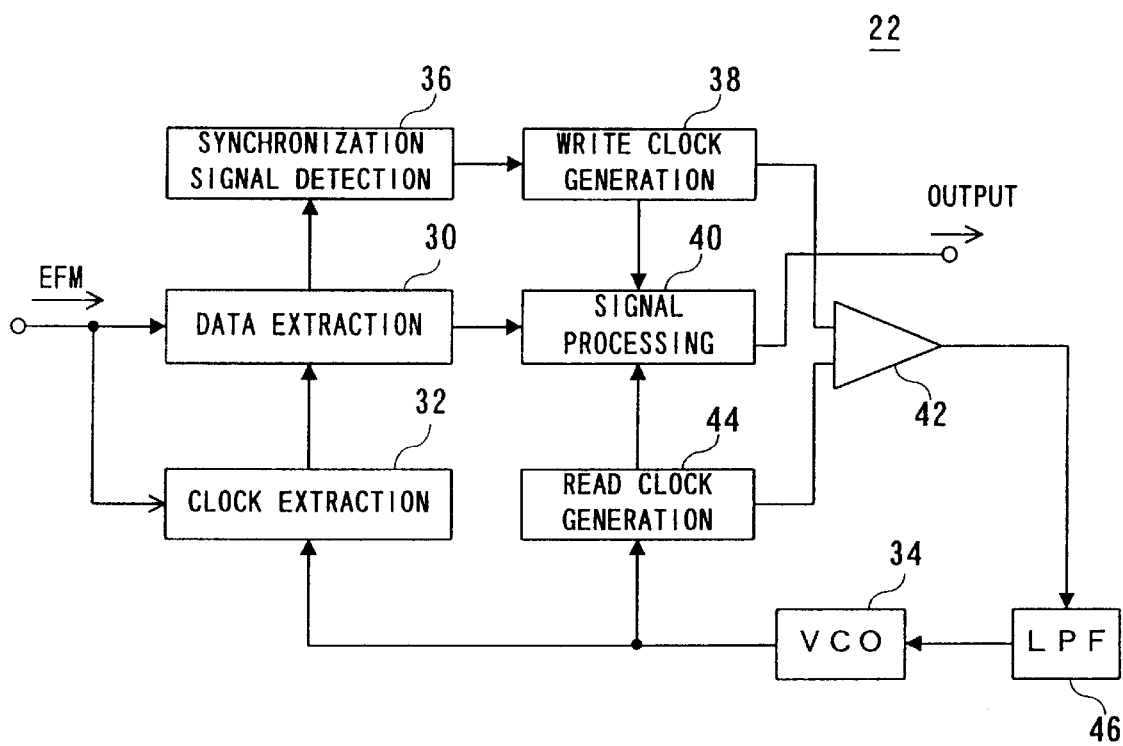
FIG. 2 is a block diagram showing a signal processing circuit of the FIG. 1 embodiment.

Referring to FIG. 2, the signal processing circuit 22 includes a data extracting circuit 30. In the data extracting circuit 30, a pulse width with a period 3T–11T (T=¼.3218 MHz) of the reproduced EFM signal is accurately discriminated according to a clock signal supplied in synchronism with the reproduced EFM signal from a clock extracting circuit 32. That is, the clock extracting circuit 32 measures a pit-edge interval of the reproduced EFM signal according to a clock signal which is supplied from a VCO (Voltage Controlled Oscillator) 34 and oscillates, for example, at a period of 1T, thereby creating signal in synchronism with the reproduced EFM signal. The clock extracting circuit 32 further supplies a clock signal for detecting 11-T pulse width data to the data extracting circuit 30 so that pattern data with a 11-T pulse width is detected from the reproduced EFM signal. Based on the pattern data, a synchronization detecting circuit 36 detects a synchronization signal. Utilizing the synchronization signal as a speed signal, the disc motor 14 is PLL-controlled with using a crystal oscillator, not shown so that the disc 12 is controlled of driving at a constant linear velocity.

That is, this embodiment is adapted to detect the reading speed for reading the data by monitoring the pulse interval of a synchronization signal so that the disc 12 is controlled of rotation at a constant linear velocity based on the obtained reading speed. That is, when the synchronization signal is detected, for example, at every 13.3 (¹⁄₇₅ frame) ms, the reading speed is determined as a normal reading speed, whereas, when the synchronization signal is detected at every 1.33 ms, the reading speed is determined as 10 times higher the normal reading speed. Incidentally, in this embodiment, the data-recordable area, i.e. the area that can record data, is divided by predetermined time periods or predetermined radii so that the data is read at a reading speed set on a zone-by-zone basis.

Meanwhile, the synchronization signal detected in the synchronization detection circuit 36 is supplied to a write clock generating circuit 38 where the same signal is replaced by a write clock signal (WFCK). This write clock signal is supplied to a signal processing section 40 so that the reproduced EFM signal is memorized in a RAM, not shown, at the timing of the write clock signal. The reproduced EFM signal is read out of the RAM according to a read clock signal (RFCK), to be stated later. In the signal processing section 40, the 14-bit binary EFM signal is converted (demodulated) into signals of 8-bit symbol data and sub-code synchronization signals. Thereafter, the sub-code data is memorized, in order, into a RAM, not shown, and errors in the same data are detected. The demodulated signal, after being subjected to de-scrambling and de-interleaving, is appropriately detected of data error. The error data is corrected or amended.

The write clock signal (WFCK) is supplied to one input of a phase comparator 42. To the other input of the phase comparator 42 is inputted an output from the read clock generating circuit 44, i.e. a read clock signal (RFCK) creating by frequency-dividing a clock signal that is supplied in oscillation at a period, for example, of 1T from the VCO 34. In the phase comparator 42, the write clock signal (WFCK) and the read clock signal (RFCK) are phase-detected, and the detected signal is smoothened in waveform by a low-pass filter (LPS) 46 and then supplied as a frequency control signal (VCO control voltage) for controlling the oscillating frequency of the VCO 34 to the VCO 34.

In this manner, the read clock signal is synchronized with the write clock signal (synchronization signal) of the reproduced signal, thereby reading out data.

Referring back to FIG. 1, the reproduced signal processed as above by the signal processing circuit 22 is supplied to a host computer 26 via an interface 24. That is, the interface 24 enables transmission and reception of control data, such as for reproducing and stoppage, or the signals read from the disc 12, between the signal processing circuit 22 and the host computer 26. The control data from the host computer 26 is supplied to a microcomputer 28 via the interface 24. The microcomputer 28 performs control on a servo circuit 20 in accordance with the control data so that the disc motor 14 and the pick-up 16 are driven.

Figure 3:
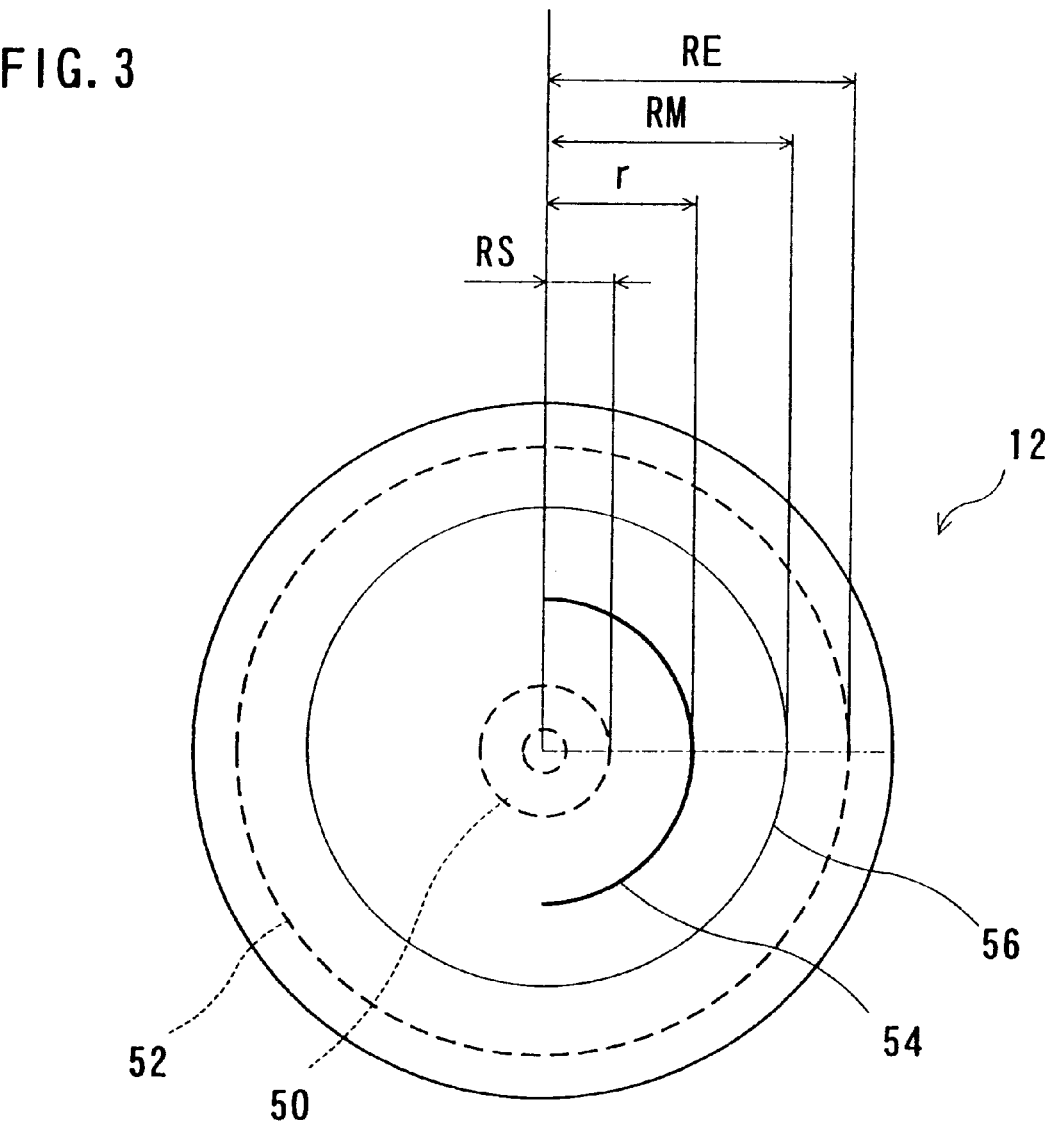
FIG. 3 is an explanatory diagram showing a recording form of data on the disc.

The microcomputer 28 has further a ROM 28a for storing the data-reading speeds (reading rates). In this embodiment, The ROM 28a memorizes the speeds ($V_1$, $V_2$) previously set on an inner circumference 50 and an outer circumference 52 of a data-recordable area (see FIG. 3) that can record data therein. These speeds represent at what times the speed the reading can be made, with reference to the normal reading speed, on a track (inner circumference 50) distant by a radius RS (=25 mm) from the center of the disc 12 and on a track (outer circumference 52) distant by a radius RE (=58 mm) from the center of the disc 12. In this embodiment, the speed ($V_1$) on the inner circumference 50 is set at 10 times higher the normal reading speed, while the speed ($V_2$) on the outer circumference 52 is set at 16 times higher the normal reading speed. The speed ($V_1$) for the inner circumference 50 is determined at least by the power performance of the disc motor 14, while the speed ($V_2$) for the outer circumference 52 is determined by the signal processing capability of the LSI constituting the signal processing circuit 22. Accordingly, the speed ($V_2$) for the outer circumference 52 can be reworded as a maximum fast reading speed at which data can be read out of the disc 12.

When reading the data recorded on the disc 12 at a region up to an outer circumference 56 distant by a radius (RM) from the center of the disc 12, the microcomputer 28 sets the speed for reading at the outer circumference 56 of the data-recorded area, i.e. the area that contains data, to the speed ($V_2$) for the outer circumference 52 previously sets in the ROM 28a. The microcomputer 28 also calculates a reading speed ($V_n$) for reading the data on the inner and outer radii (RS, RM) of the data-recorded area and the previously-set speeds ($V_1$, $V_2$) for the inner and outer circumferences.

Now, the operations will be explained with reference to a flowchart in FIG. 4.

Figure 4:
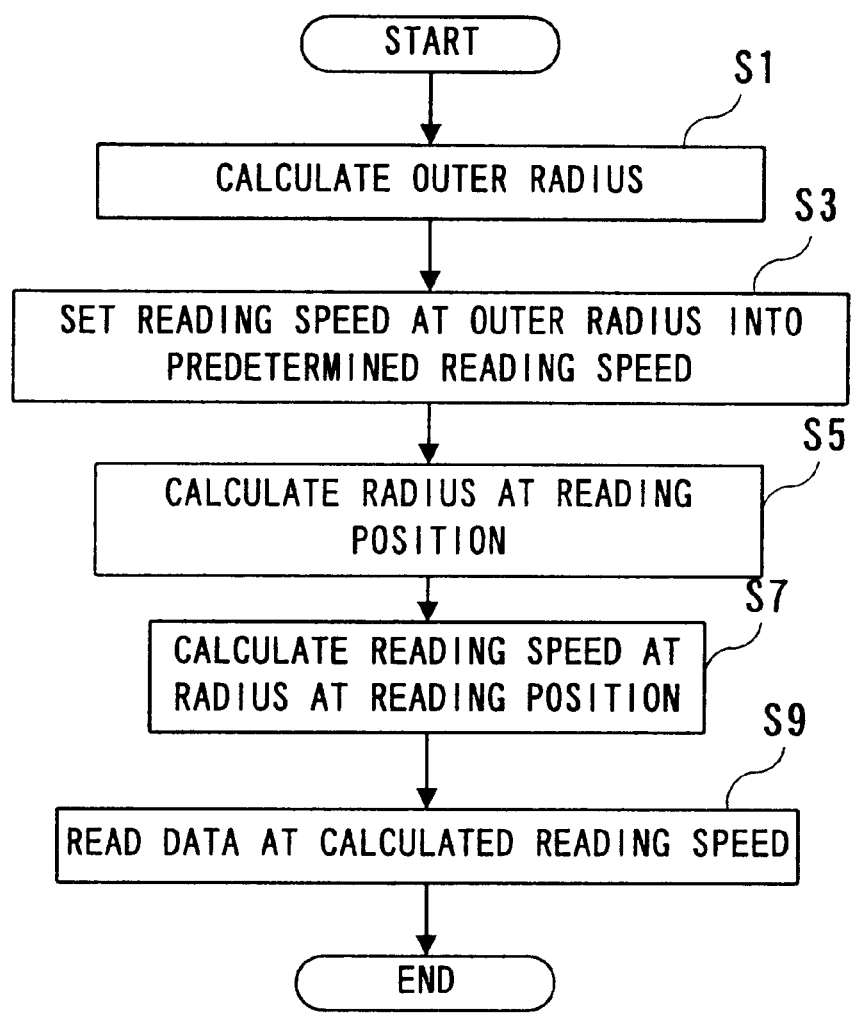
FIG. 4 is a flowchart showing part of the operation in the FIG. 1 embodiment.

First, at a step S1 of FIG. 4, the microcomputer 28 calculates a radius (RM) of the outer circumference 56 of the data-recorded area based on the amount data representative of the amount of the data recorded on the disc 12. More specifically, the disc 12 at its innermost portion contains information, as a TOC (Table Of Contents), including the amount data representative of the amount of the data recorded on the disc 12 and identification data as to each data. The reading of the TOC is initiated through the pick-up 16, simultaneously with the attachment of the disc 12 onto the apparatus. The information thus read is stored into the RAM 28b of the microcomputer 28 so that data as required is read, in order, from the RAM 28b. The amount data and the identification data are so-called of time information constituted by minute, second and frame. Based on these amount data and identification data, the amount of movement for the pick-up 16 can be determined. That is, the relationship between the time information representative of recording states and the position of data recorded, i.e. the radius of a track of recording data is given as:

$$R2=[\{60A+B+(C/75)\}\times(PN/\pi)]+RS^2 \qquad (1)$$

provided that

R: the radius (m) of a track of recording data

P: track pitch (=$1.6\times10^{-6}$ m)

N: linear velocity (m/s)

RS: inner radius (=0.25 m)

A: value representing in minute of time information

B: value representing in second of time information

C: value representing in frame of time information.

Therefore, by substituting into equation (1) the time information (A, B, C) and the linear velocity (N) as amount data obtained out of the disc 12, the radius (RM) of the outer circumference 56 of the data-recorded area can be calculated. Incidentally, the linear velocity (N) may employ 1.3 m/s as a median value in standard (1.2–1.4 m/s), or otherwise a linear velocity value obtainable by actually measuring on the disc 12. It should be noted that the use of actually measured values is preferred for enhancing the accuracy.

After calculating the radius (RM) of the outer circumference 56 of the data-recorded area, the microcomputer 28 sets, at a next step S3, the speed on the outer circumference 56 of the data-recorded area to the outer speed ($V_2$) previously set in the ROM 28a. As stated above, the speed ($V_2$) for the outer circumference of the data-recordable area is a value that has been set at a maximum fast speed based at least on the LSI signal processing capability. It, in this embodiment, is a speed of 16 times faster than the normal reading speed.

If a command for reading desired data is given from a host computer 26 to the microcomputer 28, the microcomputer 28 reads, at a step S5, time information, corresponding to the data to be read, from the information recorded in into equation (1)the RAM 28b of the microcomputer 28. The microcomputer 28 calculates the radius (r) of the inner circumference 54 of an area recording the desired data, based on the time information, i.e. identification data. Although this radius (r) of the inner circumference 54 can be calculated by substituting into Equation (1) the time information (A, B, C) as to the data to be read, this embodiment utilizes only the value (A) representing in minute among the time information while neglecting the value (B) representing in second and the value (C) representing in frame, in order to simplify the calculation on the inner radius (r) and shorten the calculation time. That is, the value representing in minute among the time information obtained from the disc 12 is substituted for the value (A) in Equation (1), and "0" is substituted for the value (B) and the value (C) in Equation (1).

If the radius (r) of the inner circumference 54 of the area recording the data to be read has been determined, the microcomputer 28 calculates, at a next step S7, a reading speed ($V_n$) for reading the desired data based on the calculated radius (r), the inner radius and outer radii (RS, RM) of the data-recorded area, and the inner and outer speeds ($V_1$, $V_2$) previously set.

Since the data has been recorded on the disc 12 such that the linear velocity per unit time becomes constant, the position of the pick-up 16 and the data reading speed are expressed by an inversely proportional linear equation. Therefore, the reading speed ($V_n$) can be calculated as given hereinbelow.

Provided that

V₁: previously set inner speed
V₂: previously set outer speed
RS: inner radius (=0.025 m) of area of recording data.
RM: outer radius of area recording data
r: inner radius of area recording data then, an equation is given as:

$$\{(V_2-V^1)/(RM-RS)\}=\{(V_2-V_n)/(RM-r)\}$$

Therefore, the reading speed ($V_n$) to be determined is expressed as $$V_n=\{(V_2-V_1)\times(r-RM)/(RM-RS)\}+V_2 \qquad (2)$$

Therefore, the reading speed ($V_n$) for reading the desired data can be calculated by substituting into equation (2) the outer radius (RM) and the inner radius (r) calculated by equation (1). If the reading speed ($V_n$) is calculated, the microcomputer 28 monitors, at a next step S9, the clock signal (synchronization signal) supplied from the signal processing circuit 22 so as to attain a linear velocity corresponding to the reading speed ($V_n$), and controls the rotational speed of the disc motor 14. The processes of the above step S1–step S9 are effected for each zone so that the data is read out of the disc 12 at the reading speed ($V_n$) that has been calculated for each zone.

Figure 5:
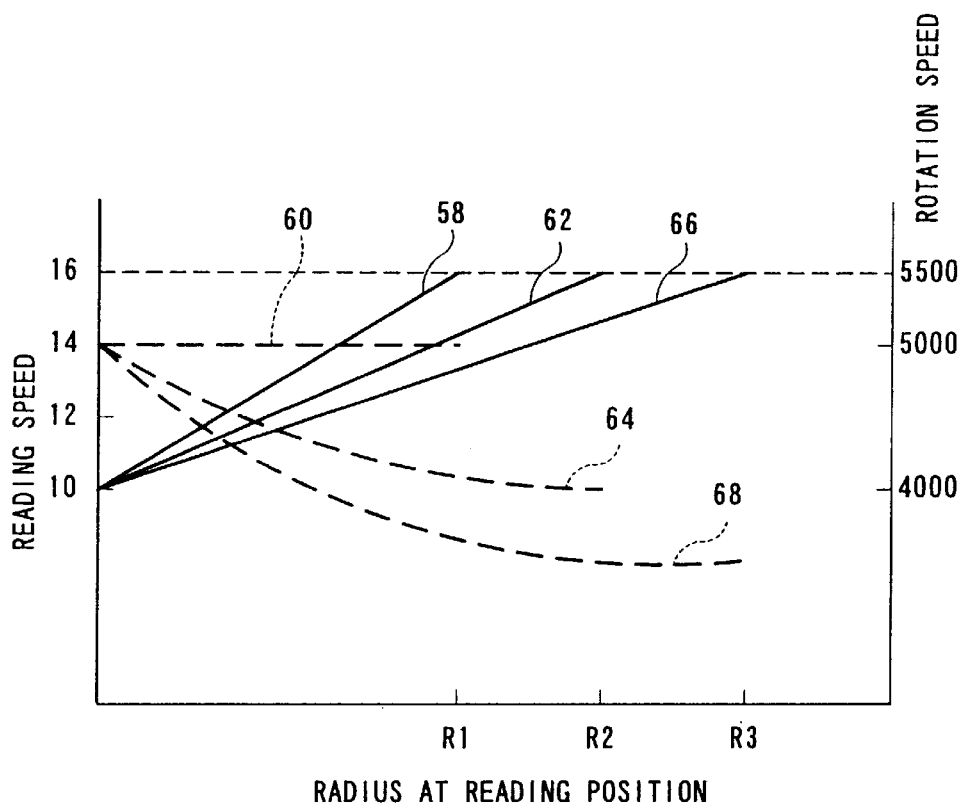
FIG. 5 is a graph showing the relationships between the radius of the reading position and the reading speed as well as the radius of a reading position and the rotational speed, as to three discs different in amount of recorded data contents.

FIG. 5 shows the relationships between the radius of a reading position and the reading speed as well as between the radius of a reading position and the rotational speed, as to three discs that are different in the amount data concerning the data being recorded. When the radius (RM) of the outer circumference 56 of the data-recorded area is "$R_1$", the radius of a reading position and the reading speed can be represented by a straight line 58. That is, when the radius of a reading position is equal to the inner radius (RS) of the disc 12, the reading speed is equal to a previously set inner reading speed (10 times), and the reading speed linearly increases with increase in the radius of the reading position. When the radius of the reading position and the outer radius (RM) of the data-recorded area become equal, the reading speed is set to a maximum fast reading speed (16 times) for reading the data.

As will be understood from the graph, when the outer radius (RM) of the data-recorded area is small, i.e. when the data amount recorded on the disc 12 is small, the rotational speed of the disc 12 is generally kept at constant regardless of the radius of the reading position. On the other hand, a straight line 62 shows the relationship between the radius of a reading position and the reading speed when the radius (RM) of the outer circumference 56 is "$R_2$", while a curved line 64 shows a change in rotational speed corresponding to the reading speed shown by the straight line 62. Also, a straight line 66 is the relationship between the radius of a reading position and the reading speed when the radius (RM) of the outer circumference 56 is "$R_3$", while a curved line 68 shows a change in rotational speed corresponding to the reading speed shown by the straight line 66. As will be well understood from the graph, the rotational speed of the disc 12 decreases with increase in the radius of the reading position.

Now, a disc reading apparatus according to another embodiment of the present invention will be shown. This embodiment is different from the above embodiment in respect of the points given below. Accordingly, the same or similar parts in structure or operation are denoted by the same reference character, omitting explanations thereof.

This embodiment, when represented in block diagram form, has the same electrical configuration as the aforesaid embodiment shown in FIG. 1. With reference to FIG. 1, a reproduced signal is read out of the disc 12 through the servo-controlled pick-up 16, which is then amplified, waveform-equalized, waveform-shaped and converted into an EFM signal by the amplifier. The EFM signal outputted from the amplifier 18 is subjected to synchronization-matching by the signal processing circuit 22, and then demodulated into 8-bit symbol data and a sub-code synchronization signal. The sub-code data is memorized by the RAM, in order, and errors in the data are detected. The demodulated signal is de-scrambled and de-interleaved, and then error data is appropriately detected. The error data is corrected or amended. The signal thus processed is delivered to the host computer 26 via the interface 24.

In this embodiment, an FG (frequency generator) is provided on the disc motor 14 so that the disc 12 rotational speed is controlled based on the output of the FG. That is, the data-recordable area is divided by predetermined time periods or predetermined radii into zones so that the rotational speed is set for each zone. The data contained in each zone is read out at a rotational speed set therefore. Consequently, the data contained in one zone is read out of the disc 12 that is rotating at a constant angular speed. The ROM 28a of the microcomputer 28 is stored with a speed ($V_1$) for the inner circumference 50 of the data-recordable area and a speed ($V_2$) for the outer circumference 52 of the same area, in place of the disc 12 rotational speed. That is, the rotational speed of the disc 12 is expressed as:

$$S=V\times 60\times N/2\pi R \qquad (3)$$

provided that
S: rotational speed
N: linear velocity
V: reading speed
R: radius of relevant track.

In this embodiment, when detailed numerals representing the rotational speed are required such as when the disc 12 is rotated at a constant angular speed, the reading speed is converted into a rotational speed by using Equation (3). When no detailed rotational speed is necessary, the reading speed is substituted for the rotational speed of the disc 12.

Figure 6:
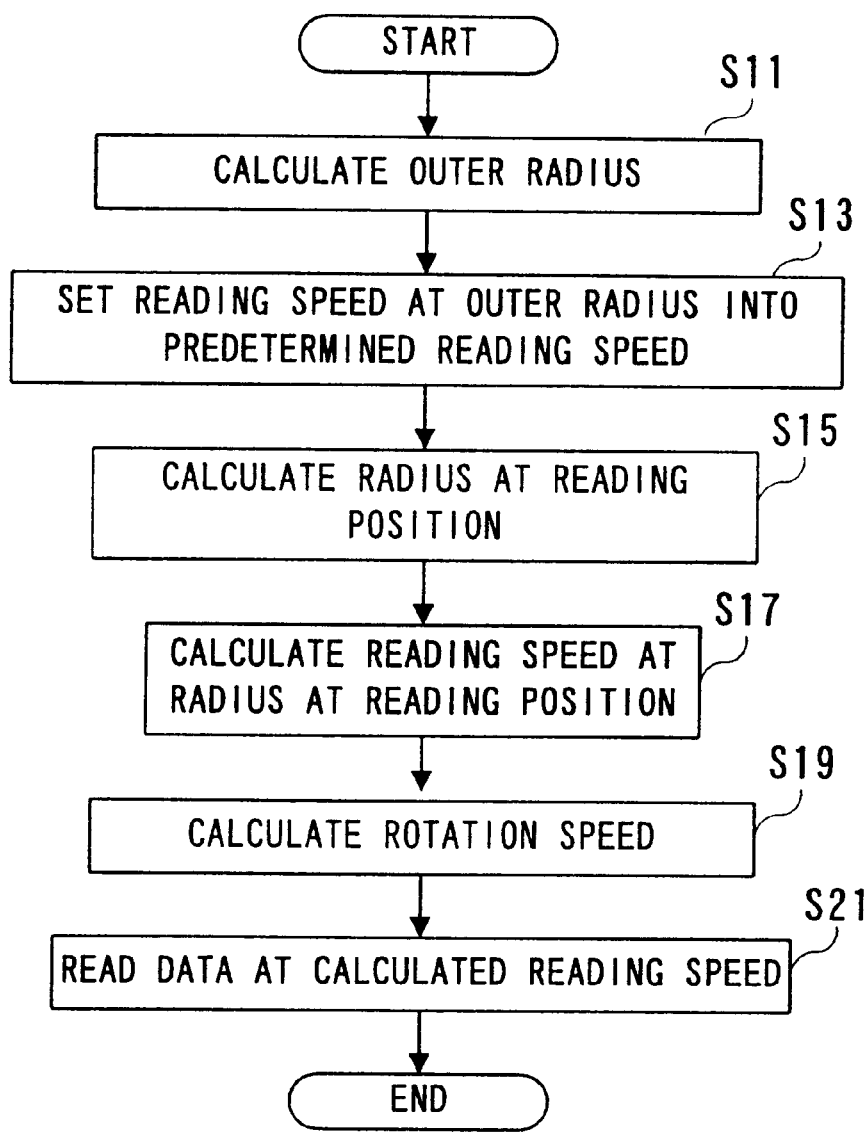
FIG. 6 is a flowchart showing part of the operation in another embodiment of the present invention.

Now explanations will be made on the operation of this embodiment with reference to a flowchart in FIG. 6. At a step S11 of FIG. 6, the microcomputer 28 calculates the radius (RM) of the outer circumference 56 of the data-recorded area, based on the amount data representative of the amount of data recorded on the disc 12, i.e. time information. That is, the time information (A, B, C) and the linear velocity (N) obtained from the disc 12 are substituted into Equation (1) shown in the above embodiment, thereby calculating the radius (RM) of the outer circumference 56. If the radius (RM) of the outer circumference 56 of the data-recorded area has been calculated, the microcomputer 28 calculates, at a next step S13, the disc 12 rotational speed for reading at the outer circumference 56 from the outer speed ($V_2$) previously set in the ROM 28a. However, there is no necessity of a detailed rotational speed for reading the outer circumference 56 so that the speed ($V_2$) as an alternate value is employed for the rotational speed without conducting a process for determining the rotational speed.

If a command for reading desired data is given from the host computer 26 to the microcomputer 28, the microcomputer 28, at a next step S15, reads time information, as to the data to be read, out of the information recorded in the RAM 28b. Based on the time information, i.e. the identification data, the microcomputer calculates the radius (r) of the inner circumference 54 of the area recording the data to be read. By substituting the time information (A, B, C) as to the data to be read into Equation (1) shown in the above embodiment, it is possible to calculate the radius (r) of the inner circumference 54 of the area recording desired data at this time. The calculation time can be shortened by using only the value (A) representing in minute among the time information with the value (B) representing in second and the value (C) representing in frame neglected.

After determining the radius (r) of the inner circumference 14 of the area recording the data to be read, the disc 12 rotational speed for reading out data is calculated by using Equation (2) shown in the above embodiment. That is, the reading speed ($V_n$) is calculated by substituting into Equation (2) the inner reading speed and the outer speeds ($V_1$, $V_2$) previously set, the inner and outer radii (RS, RM) of the data-recorded area, and the inner radius (r) of the area recording the data to be read. At a next step S19, the reading speed ($V_n$) is substituted into Equation (3), thereby calculating the rotational speed (S) of the disc 12. If the rotational speed (S) has been calculated, the FG pulse is monitored at a step S21 to control the disc motor 14 so that it becomes the calculated rotational speed (S). The above processes are carried out for each zone so that the data is read out of the disc 12 that is rotating at a rotational speed, i.e. an angular speed, set for each zone.

Figure 7:
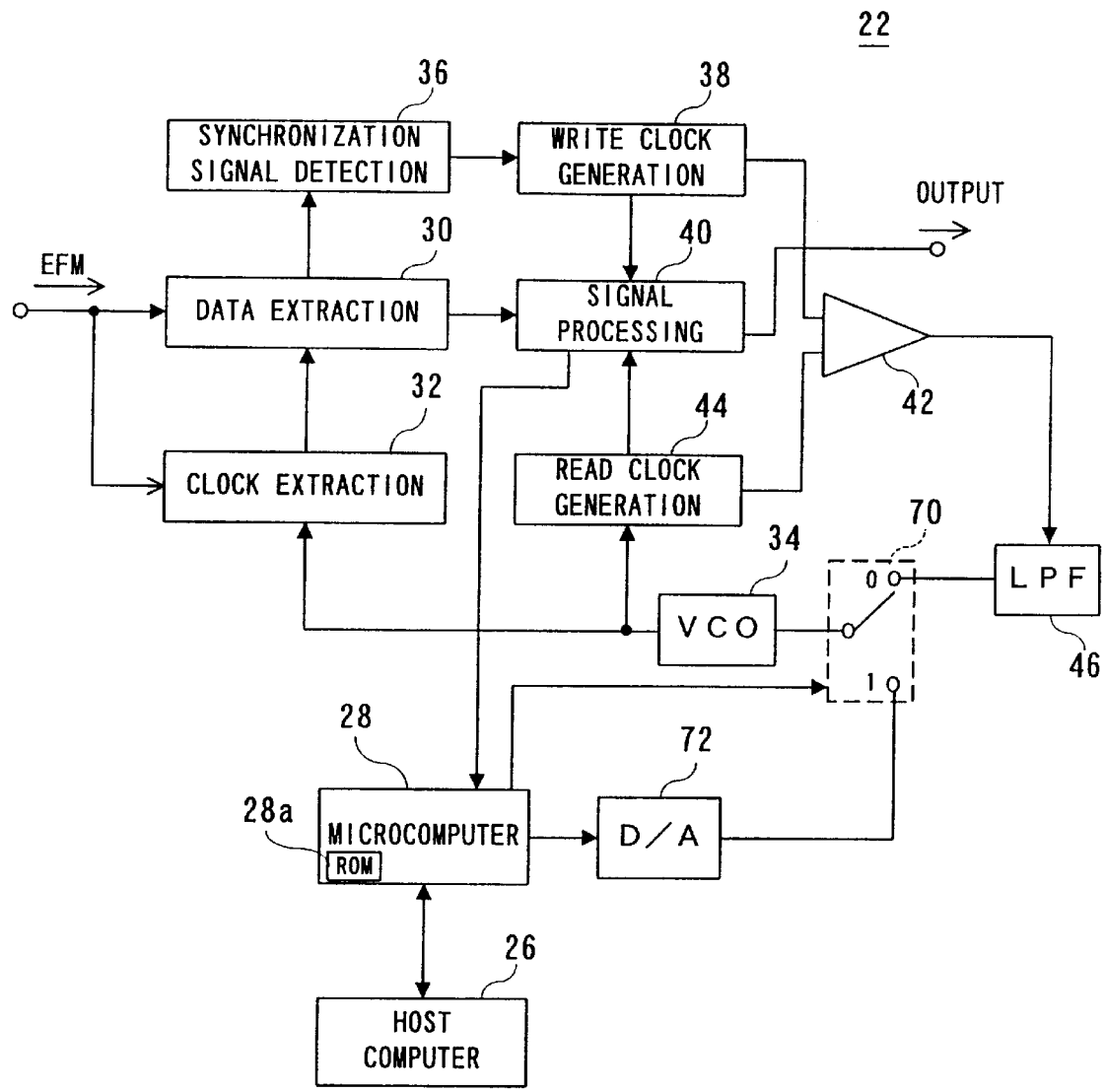
FIG. 7 is a block diagram showing a modification to the signal processing circuit.

FIG. 7 shows a modification to the signal processing circuit 22. Incidentally, the same or similar parts as those of the signal processing circuit 22 shown in FIG. 2 are denoted by the same reference character, omitting detailed explanations thereof.

That is, the signal processing circuit 22 of FIG. 7 includes a switch 70 that is controlled by the microcomputer 28. Through the switch 70 the output of a phase comparator 42 is selectively supplied to the VCO 34. That is, the microcomputer 28 has at least address information representing a current position supplied from a signal processing section 40 and target address information supplied from a host CPU 26 so that the microcomputer 28 connect the switch 70 to a terminal "0" or a terminal "1". When the terminal "0" is selected, the detected signal from a phase comparator 42 is supplied as a VCO control voltage (second control voltage) to a VCO 34 through an LPF 46. On the other hand, when the terminal "1" is elected, a VCO control voltage (first control voltage) in accordance with the reading speed (or rotational speed) obtained from Equation (2) is supplied to the VCO 34 through a D/A converter 72.

Figure 8:
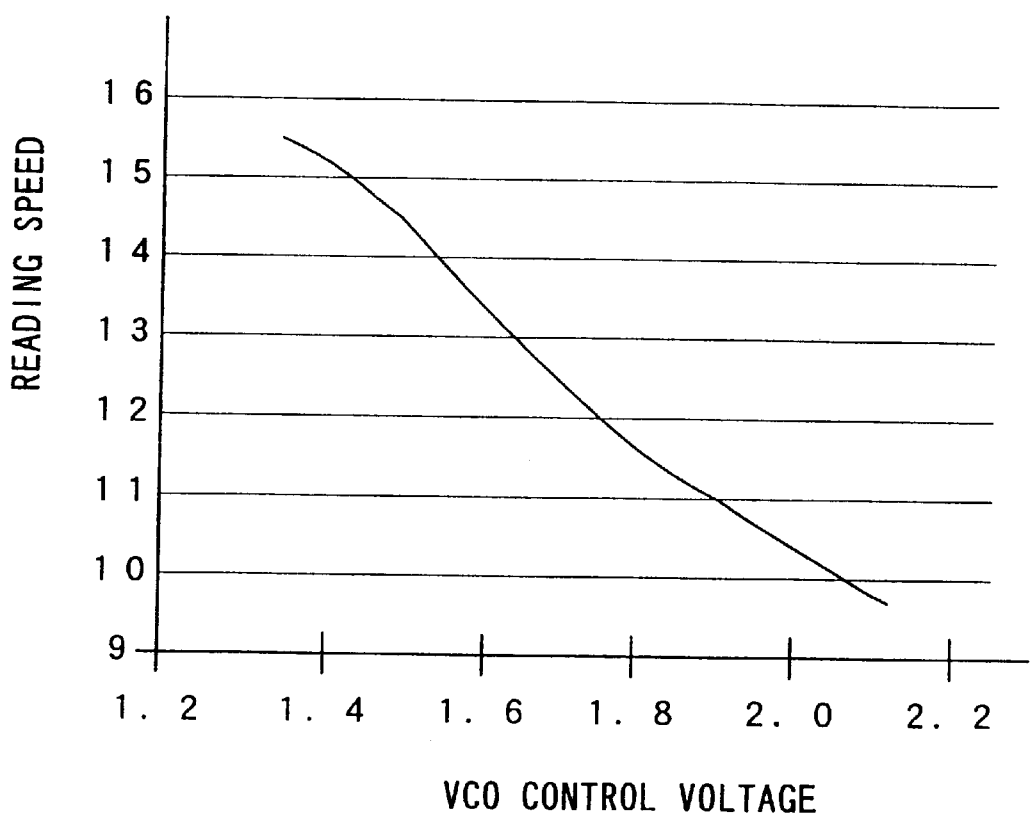
FIG. 8 is a graph showing the relationship between the reading speed and the VCO control voltage.

That is, the ROM 28a as a memory means has a VCO control voltage (first control voltage) that can vary depending upon a reading speed (rotational speed), for example, in a data table form such that they satisfy the relationship as shown in FIG. 8. When the reading speed is calculated according to Equation (2), a VCO control voltage (first control voltage) corresponding to the reading speed (or rotational speed) is read out of the ROM 28a. The microcomputer 28 analog-converts this VCO control voltage by the D/A converter 72 so as to connect the switch 70 to the terminal "1", thereby supplying the VCO control voltage previously memorized in the ROM 28a to the VCO 34. Based on the VCO control voltage, the VCO 34 oscillates to provide an oscillating frequency signal. From the oscillating frequency signal, a read out clock signal (RFCK) is created so that a reproduced signal is read out according to the read out clock signal.

Then the microcomputer 28 monitors the position of the pick-up 16 based on the sub-code data supplied from the signal processing section 40. When the pick-up 16 is, for example, within one track of a target position, the microcomputer 28 connects the switch 70 to the terminal "0". That is, the VCO 34 is supplied with the output of the LPF 46 immediately in front of the target position. Therefore, even where the difference in rotational speed between at the inner circumference and the outer circumference on the disc 12 is significantly large, as in an accessing mode for moving the pick-up 16 at a high speed, there is no affection by noises due to phase disturbances, enhancing substantially the response speed of the VCO 34 and shortening the access time.

According to the embodiments stated above, the reading speed (or rotational speed) for reading on the outer circumference of the data-recorded area is set to a maximum fast predetermined speed within a speed range in which the previously set data can be read out. Since the reading speed (or rotational speed) for reading the data to be read is determined based on the predetermined speed (or rotational speed), it is possible to read the data at high speeds while exhibiting fully the performance of the apparatus itself.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc reading apparatus, comprising:
   a first calculating means for calculating, based on amount data, an outer radius of a data-recorded area having data recorded therein, the amount data being recorded together with the data on a disc so as to represent an amount of the data;
   a setting means for setting, for the calculated outer radius, a previously-set first predetermined speed on an outer circumference of a data-recordable area that can record data therein; and
   a speed calculating means for calculating a reading speed for the data to be read based on the first predetermined speed.

2. A disc reading apparatus according to claim 1, further comprising a second calculating means for calculating an inner radius of an area recording the data to be read based on identification data as to the data to be read.

3. A disc reading apparatus according to claim 2, wherein the identification data contains time information in minute, second and frame.

4. A disc reading apparatus according to claim 3, where the inner radius of the area recording the data to be read is calculated by using only the data of the time information representing minutes.

5. A disc reading apparatus according to claim 2, wherein said speed calculating means calculates the reading speed for reading the data based on an inner and the outer radius of the data-recorded area, the inner radius of the area recording the data to be read, and the first predetermined speed and a previously-set second predetermined speed.

6. A disc reading apparatus according to claim 1, wherein the data-recordable area of said disc is previously divided into a plurality of zones, and the speed calculating means calculates the reading speed on a zone-by zone basis.

7. A disc reading apparatus according to claim 1, wherein the previously set predetermined speed is a maximum fast speed within a speed range in which the data is readable out of said disc.

8. A disc reading apparatus according to claim 1, wherein the amount data contains time information.

9. A disc reading apparatus according to claim 1, further comprising a voltage controlled oscillator having an oscillating frequency that is variable depending upon a control voltage;

a memory means for memorizing a first control voltage corresponding to the reading speed; and a voltage applying means for applying selectively the first control voltage and a second control voltage from a low-pass filter to said voltage controlled oscillator.

10. A disc reading apparatus according to claim 9, wherein said voltage controlled oscillator is supplied with the first control voltage when an accessing mode for moving said pick-up at a high speed to a target position is selected, and said voltage controlled oscillator being supplied with the second control voltage immediately in front of the target position.

11. A disc reading apparatus, comprising:

a first calculating means for calculating, based on amount data, an outer radius of a data-recorded area having data recorded therein, the amount data being recorded together with the data on a disc so as to represent an amount of the data;

a setting means for setting, for the calculated outer radius, a previously-set first predetermined rotational speed on an outer circumference of a data-recordable area that can record data therein; and a speed calculating means for calculating a rotational speed of said disc for reading the data based on the first predetermined rotational speed.

12. A disc reading apparatus according to claim 11, further comprising a second calculating means for calculating an inner radius of an area recording the data to be read, based on identification data as to the data to be read.

13. A disc reading apparatus according to claim 12, wherein the identification data contains time information in minute, second and frame.

14. A disc reading apparatus according to claim 13, where the inner radius of the area recording the data to be read is calculated by using only the data of the time information representing minutes.

15. A disc reading apparatus according to claim 12, wherein said speed calculating means calculates the rotational speed for reading the data to be read, based on an inner and the outer radius of the data-recorded area, the inner radius of the area recording the data to be read, and the first predetermined speed and a previously-set second predetermined speed.

16. A disc reading apparatus according to claim 11, further comprising a reading means for reading at the previously set rotational speed and a converting means for converting the reading speed thus read into a rotational speed for said disc, wherein the reading speed read by said reading means is used as the rotational speed on the outer circumference of the data-recordable area of said disc.

17. A disc reading apparatus according to claim 11, wherein the data-recordable area of said disc is previously divided into a plurality of zones, and the speed calculating means calculates the rotational speed for said disc on a zone-by zone basis.

18. A disc reading apparatus according to claim 11, wherein the previously set first rotational speed for said disc is a maximum fast speed within a speed range in which the data is readable out of said disc.

19. A disc reading apparatus according to claim 11, wherein the amount data contains time information.

20. A disc reading apparatus according to claim 11, further comprising a voltage controlled oscillator having an oscillating frequency that is variable depending upon a control voltage;

a memory means for memorizing a first control voltage corresponding to the rotational speed; and a voltage applying means for applying selectively the first control voltage and a second control voltage from a low-pass filter to said voltage controlled oscillator.

21. A disc reading apparatus according to claim 20, wherein said voltage controlled oscillator is supplied with the first control voltage when an accessing mode for moving said pick-up at a high speed to a target position is selected, and said voltage controlled oscillator being supplied with the second control voltage immediately in front of the target position.

\* \* \* \* \*